(12) United States Patent
Ishida et al.

(10) Patent No.: US 9,537,364 B2
(45) Date of Patent: Jan. 3, 2017

(54) ROTARY ELECTRIC MOTOR STATOR WITH THERMALLY EXPANDING LAYERED SLOT LINER

(71) Applicants: Takeshi Ishida, Toyota (JP); Takahiro Tsukamoto, Obu (JP)

(72) Inventors: Takeshi Ishida, Toyota (JP); Takahiro Tsukamoto, Obu (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 756 days.

(21) Appl. No.: 13/873,384

(22) Filed: Apr. 30, 2013

(65) Prior Publication Data
US 2013/0300248 A1 Nov. 14, 2013

(30) Foreign Application Priority Data

May 9, 2012 (JP) ................. 2012-107327

(51) Int. Cl.
| | |
|---|---|
| H02K 3/34 | (2006.01) |
| H02K 15/10 | (2006.01) |
| H02K 3/40 | (2006.01) |
| H02K 15/12 | (2006.01) |
| H02K 3/48 | (2006.01) |

(52) U.S. Cl.
CPC ............... H02K 3/345 (2013.01); H02K 3/40 (2013.01); H02K 15/10 (2013.01); H02K 15/105 (2013.01); H02K 15/12 (2013.01); H02K 3/48 (2013.01)

(58) Field of Classification Search
CPC ............ H02K 3/345; H02K 3/04; H02K 3/12; H02K 3/40; H02K 3/30; H02K 3/34; H02K 15/00–15/165; H01B 7/0208; H01B 17/62

USPC .............. 174/138 E, 148, DIG. 16, DIG. 26, 174/DIG. 20, DIG. 19, DIG. 22, 174, 212, 174/209; 310/214, 215
See application file for complete search history.

(56) References Cited

U.S. PATENT DOCUMENTS

| | | | | |
|---|---|---|---|---|
| 3,735,169 | A | * | 5/1973 | Balke et al. ............... 310/214 |
| 3,777,198 | A | * | 12/1973 | Anderson et al. ........... 310/200 |
| 3,852,137 | A | * | 12/1974 | Balke et al. ............... 156/196 |

(Continued)

FOREIGN PATENT DOCUMENTS

| | | |
|---|---|---|
| JP | 57-022345 A | 2/1982 |
| JP | 59-117435 A | 7/1984 |

(Continued)

OTHER PUBLICATIONS

PTO 15-105003, Translation of JP 59-117435 A, cited in Information Disclosure Statement (Apr. 30, 2013.*

(Continued)

Primary Examiner — Thomas Truong
(74) Attorney, Agent, or Firm — Dinsmore & Shohl LLP

(57) ABSTRACT

In an expansion sheet for a rotary electric machine that has a thermal expansion property and is to be arranged between a core and a coil conductor in a slot in the rotary electric machine, in which the coil conductor is housed in the slot formed in the core, the expansion sheet has a first surface and a second surface and includes: a first surface-side portion; and a second surface-side portion that is closer to the second surface than the first surface-side portion. An amount of volume increase, caused by heating, of the first surface-side portion is higher than an amount of volume increase, caused by the heating, of the second surface-side portion.

19 Claims, 10 Drawing Sheets

(56) References Cited

U.S. PATENT DOCUMENTS

| | | | | |
|---|---|---|---|---|
| 5,252,877 | A | * | 10/1993 | Sawa et al. ............... 310/214 |
| 5,254,397 | A | * | 10/1993 | Kawai et al. ............. 428/293.4 |
| 6,140,733 | A | * | 10/2000 | Wedde et al. ................ 310/196 |
| 6,724,118 | B2 | * | 4/2004 | Emery ........................ 310/215 |
| 6,995,491 | B2 | * | 2/2006 | Kimura et al. ............... 310/215 |
| 7,812,260 | B2 | * | 10/2010 | Miller .................... C09J 7/04 174/120 R |
| 8,946,970 | B2 | * | 2/2015 | Knapp et al. ................ 310/214 |
| 2005/0040277 | A1 | * | 2/2005 | Lester .................. H02K 3/345 242/433.3 |
| 2005/0280328 | A1 | * | 12/2005 | Neet ........................... 310/214 |
| 2007/0052317 | A1 | * | 3/2007 | Tanaka ................. H02K 3/345 310/215 |
| 2007/0222324 | A1 | * | 9/2007 | Fukui et al. ................. 310/215 |
| 2008/0007134 | A1 | * | 1/2008 | Shimura et al. ............. 310/214 |
| 2008/0106157 | A1 | * | 5/2008 | Higashimura .......... H02K 3/40 310/45 |
| 2008/0284262 | A1 | * | 11/2008 | Nelson et al. ................. 310/52 |
| 2010/0244615 | A1 | | 9/2010 | Kouda |
| 2012/0169172 | A1 | * | 7/2012 | Anderton ............... H02K 3/30 310/214 |

FOREIGN PATENT DOCUMENTS

| | | | | |
|---|---|---|---|---|
| JP | 61277347 | A | | 12/1986 |
| JP | 62-272847 | A | | 11/1987 |
| JP | 01-166780 | U | | 11/1989 |
| JP | 09-117087 | A | | 5/1997 |
| JP | 2002-262500 | A | | 9/2002 |
| JP | 2008306134 | A | * | 12/2008 ............ H01L 25/04 |
| JP | 2009-033889 | A | | 2/2009 |
| JP | 2010-259316 | A | | 11/2010 |
| JP | 2011-244596 | A | | 12/2011 |

OTHER PUBLICATIONS

PTO 15-105012, Translation of JP 61-277347, cited in Information Disclosure Statement (Apr. 30, 2013).*
PTO 15-105014, Translation of JP 57-022345 A, cited in Information Disclosure Statement (Apr. 30, 2013).*
Machine Translation of JP 2008306134 A.*
Robert Dobbs et al., Laser Cutting of Fibrous Quartz Insulation Materials, Oct. 1994, Journal of Engineering Materials and Technology, vol. 116, pp. 539-544.*

* cited by examiner

ROTARY ELECTRIC MOTOR STATOR WITH THERMALLY EXPANDING LAYERED SLOT LINER

INCORPORATION BY REFERENCE

The disclosure of Japanese Patent Application No. 2012-107327 filed on May 9, 2012 including the specification, drawings and abstract is incorporated herein by reference in its entirety.

BACKGROUND OF THE INVENTION

1. Field of the Invention

The invention relates to an expansion sheet for a rotary electric machine, a stator for a rotary electric machine using an expansion sheet for a rotary electric machine, and a manufacturing method of a stator for a rotary electric machine.

2. Description of Related Art

A vehicle such as a hybrid vehicle or an electric vehicle is typically provided with a rotary electric machine capable of functioning as both a motor and a generator. The rotary electric machine typically includes a stator, and a rotor that rotates with respect to the stator, with a predetermined gap created therebetween. The stator includes a stator core, and a plurality of coil conductors that are wound around the stator core.

When the rotary electric machine functions as a motor, direct current (DC) power from a power supply such as a secondary battery or a fuel cell is stepped up to a desired voltage using a step-up converter as necessary, and converted to a polyphase alternating current (AC) power by an inverter. The resultant current then flows through the coil conductors that are wound around the stator, causing the rotor to rotate. On the other hand, when the rotary electric machine functions as a generator, rotation of the rotor causes current to flow through the coil conductors that are wound around the stator. The power obtained at this time is charged to the secondary battery or the like as regenerative power, or is supplied to electronic equipment such as auxiliary equipment, and consumed as driving power.

Slots are formed in the stator core of the stator for the rotary electric machine. The coil conductors are housed in these slots. At this time, an insulating layer for insulation needs to be formed between the inner peripheral surface of each slot and the corresponding coil conductor. One example of a method for providing this insulating layer in the slot is a method using an insulating sheet.

Japanese Patent Application Publication No. 59-117435 (JP 59-117435 A) relates to a high-voltage coil of a rotary electric machine, and describes housing, in a groove of an iron core, a coil conductor that is wound surrounded by a slot liner having a conductive foam layer on both sides of graphite paper.

Japanese Utility Model Application Publication No. 01-166780 (JP 01-166780 U) relates to a rotary electric machine for a compressor, and describes installing insulating paper having a trilaminar structure in which surface layers of different thicknesses are formed on both sides, such that the thin surface layer is on a coil side and the thick surface layer is on an iron core side.

Japanese Patent Application Publication No. 61-277347 (JP 61-277347 A) relates to motor insulating paper of a compressor, and describes slot insulating paper in which first insulating paper material that is extremely strong mechanically is laminated to second insulating paper material that is heat resistant.

Japanese Patent Application Publication No. 2002-262500 (JP 2002-262500 A) describes a rotary electric machine in which a stator coil is supported by a bimetal in which a plurality of sheets of material having different coefficients of thermal expansion are laminated together.

Japanese Patent Application Publication No. 2010-259316 (JP 2010-259316 A) relates to a stator for a rotary electric machine, and recites that, in an adhesive sheet that has a trilaminar structure formed by an adhesive layer that is laminated to each side of an insulating layer, and resin that forms the adhesive layer may have expandability.

SUMMARY OF THE INVENTION

The invention provides an expansion sheet for a rotary electric machine, with which it is made possible to improve the fixedness of a coil conductor in a slot, a stator for a rotary electric machine using an expansion sheet for a rotary electric machine, and a manufacturing method of a stator for a rotary electric machine.

A first aspect of the invention is an expansion sheet for a rotary electric machine that has a thermal expansion property and that is to be arranged between a core and a coil conductor in a slot in the rotary electric machine, in which the coil conductor is housed in the slot formed in the core, the expansion sheet having a first surface and a second surface and including: a first surface-side portion; and a second surface-side portion that is closer to the second surface than the first surface-side portion, wherein an amount of volume increase, caused by heating, of the first surface-side portion is higher than an amount of volume increase, caused by the heating, of the second surface-side portion.

A second aspect of the invention is a stator for a rotary electric machine that includes: a stator core in which a slot is formed; a coil conductor that is housed in the slot; and the expansion sheet according to the first aspect of the invention that is arranged between the stator core and the core conductor with the first surface facing the coil conductor and with the second surface facing the stator core, wherein the coil conductor is fixed to the stator core by the expansion sheet.

A third aspect of the invention is a manufacturing method of a stator for a rotary electric machine that includes: inserting the expansion sheet according to the first aspect of the invention into a slot in a stator core with the second surface facing the stator core; tentatively adhering, to an inner wall surface of the slot, the second surface of the expansion sheet that has been inserted into the slot; housing the coil conductor in the slot; and adhering an outer peripheral surface of the coil conductor to the first surface of the expansion sheet, and adhering the inner wall surface of the slot to the second surface of the expansion sheet, by expanding and curing the expansion sheet by heating the expansion sheet.

A fourth aspect of the invention is a manufacturing method of a stator for a rotary electric machine that includes: limiting expansion of an edge portion of the expansion sheet according to the first aspect of the invention by laser processing the edge portion of the expansion sheet, and then inserting the expansion sheet into the slot of the stator core with the second surface facing the stator core; tentatively adhering, to an inner wall surface of the slot, the second surface of the expansion sheet that has been inserted into the slot; housing the coil conductor in the slot; and adhering an outer peripheral surface of the coil conductor to the first surface of the expansion sheet, and adhering the inner wall surface of the slot to the second surface of the expansion sheet, by expanding and curing the expansion sheet by heating the expansion sheet.

According to the invention, a gap between a coil conductor housed in a slot and a slot inner wall surface is eliminated or reduced, so that the fixedness of the coil conductor in the slot is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
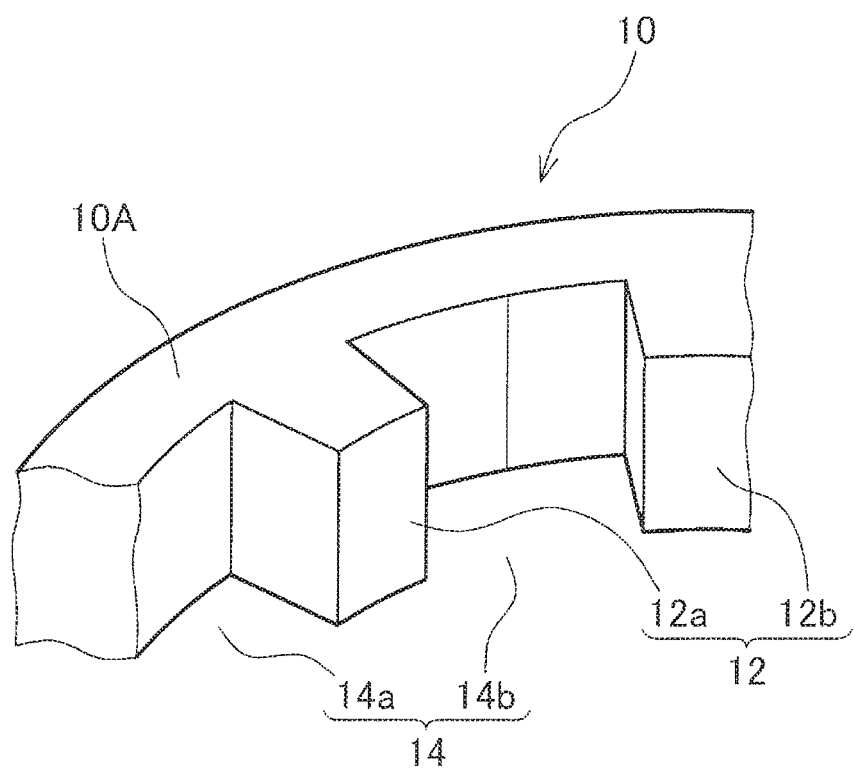
FIG. 1 is a partial perspective view of an example of a stator core of a rotary electric machine.

Hereinafter, embodiments of the invention will be described with reference to the accompanying drawings. In the drawings, like structures will be denoted by like reference characters, and descriptions of those structures are omitted or simplified in some cases.

(Expansion Sheet for a Rotary Electric Machine)

FIG. 1 is a partial perspective view of an example of a stator core for a rotary electric machine when an insulating sheet for a rotary electric machine or an expansion sheet for a rotary electric machine and a coil conductor, that will be described later, are not arranged between teeth viewed from an end surface 10A of the stator core. As shown in FIG. 1, a stator core 10 has a plurality of teeth 12 including teeth 12a, 12b, that are formed so as to protrude radially inward, and a plurality of slots 14 including slots 14a, 14b, . . . that are formed between adjacent teeth.

Figure 2A:
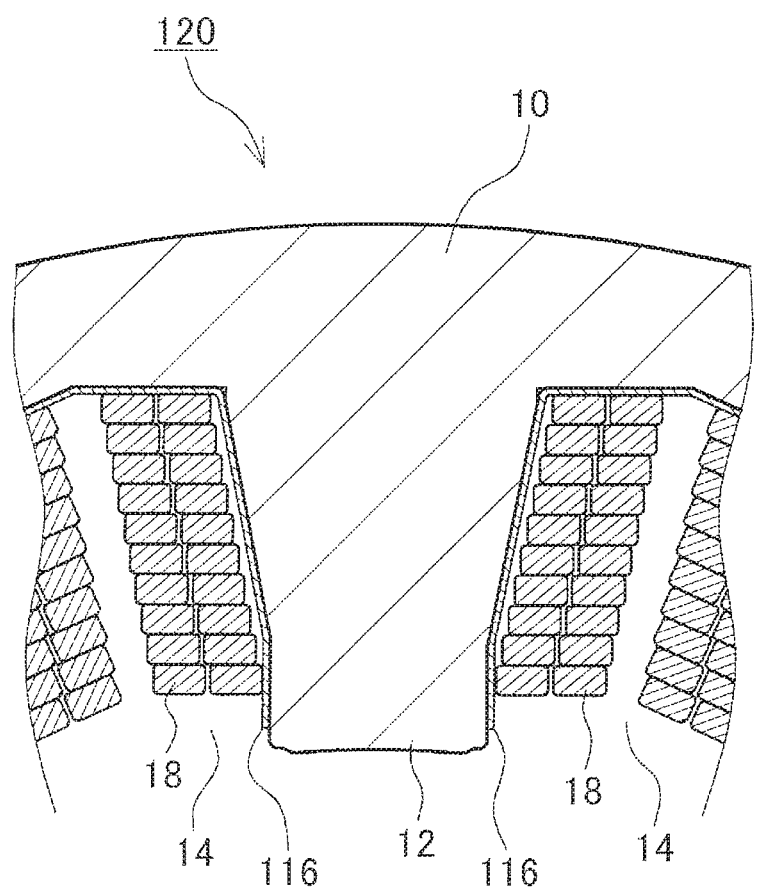
FIG. 2A is a partial sectional view of a comparative example of a stator for a rotary electric machine, in which an insulating sheet is inserted inside a slot.

FIG. 2A is a partial sectional view of a comparative example of a stator for a rotary electric machine (hereinafter simply referred to as "stator") to which an insulating sheet for a rotary electric machine (hereinafter simply referred to as "insulating sheet") and a coil conductor are attached. In a stator 120 illustrated in FIG. 2A, an insulating sheet 116 is inserted into each slot 14 of the stator core. Also, a coil conductor 18 is attached via the insulating sheet 116 to the outer periphery of the teeth 12.

Figure 2B:
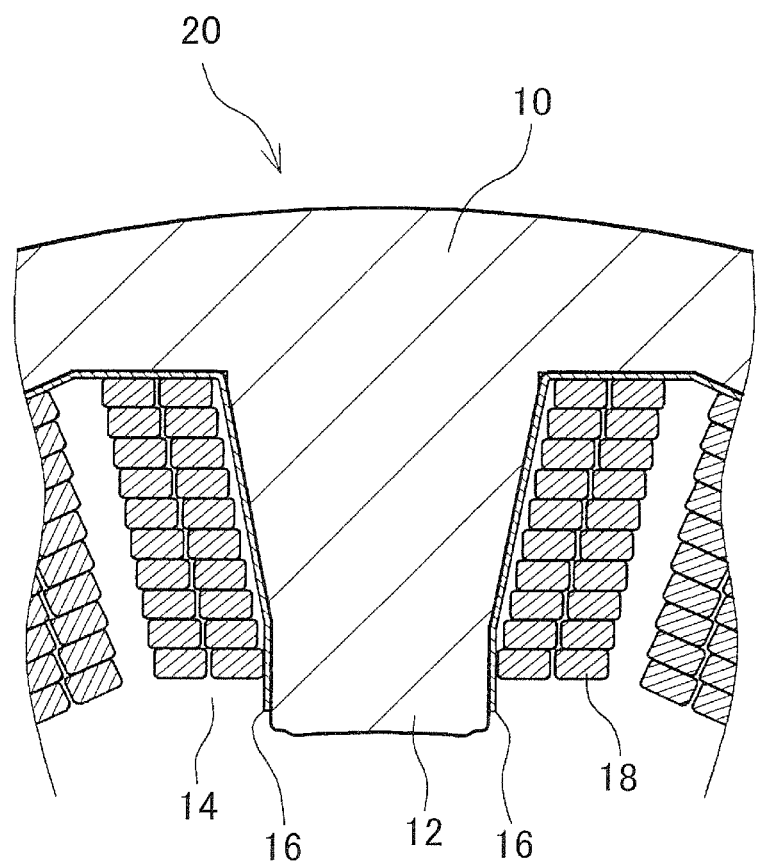
FIG. 2B is a partial sectional view of an example of a stator for a rotary electric machine, in which an expansion sheet is inserted inside a slot.
Figure 3:
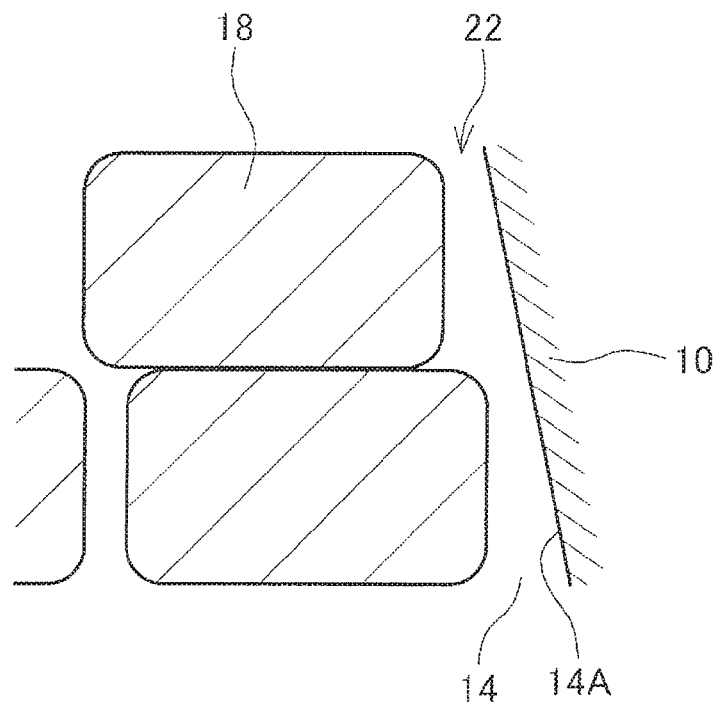
FIG. 3 is a partial enlarged view for illustrating a gap formed between an inner wall surface of the slot and a coil conductor.

Here, when conductive material referred to as a so-called rectangular wire or flat wire, which has a generally rectangular sectional shape, is used as the coil conductor 18 shown in FIG. 2A, a stepped gap 22 in which the interval is uneven is formed between an inner wall surface 14A of the slot 14 and the coil conductor 18, as shown in FIG. 3. In this way, with the insulating sheet 116 shown in FIG. 2A, a case may arise in which it may be difficult to appropriately fill the gap in which the end surface shape largely differs between the coil conductor 18 side and the inner wall surface 14A side of the slot 14. Therefore, as shown in FIG. 2B, by using an expansion sheet for a rotary electric machine (hereinafter, simply referred to as "expansion sheet") 16 of embodiments of the invention instead of the insulating sheet 116 shown in FIG. 2A, the gap formed between the inner wall surface of the slot 14 and the coil conductor 18 is eliminated or reduced.

Figure 4:
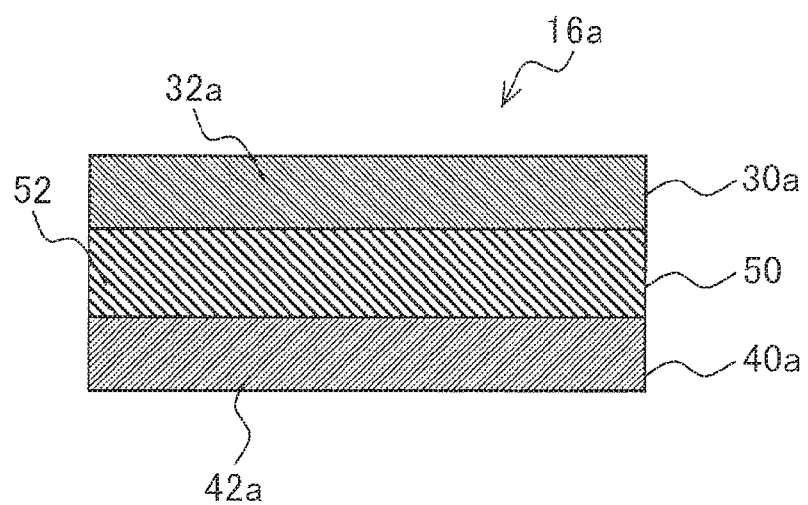
FIG. 4 is a partial sectional view of a first embodiment of an expansion sheet for a rotary electric machine of the invention.

FIG. 4 is a sectional view schematically showing a structure of the expansion sheet of a first embodiment of the invention. As shown in FIG. 4, an expansion sheet 16a includes: a stator core-side expansion layer 30a that contains a first epoxy resin composition 32a that expands when heated; a coil conductor-side expansion layer 40a that contains a second epoxy resin composition 42a that expands by a higher volume increase amount than the stator core-side expansion layer 30a when heated; and an insulating film 50 that is arranged between the stator core-side expansion layer 30a and the coil conductor-side expansion layer 40a, and contains insulating material 52. The expansion sheet 16a is arranged such that one surface of the stator core-side expansion layer 30a contacts one surface of the insulating film 50, and one surface of the coil conductor-side expansion layer 40a contacts the other surface of the insulating film 50. Note that in all embodiments described herein, the surface of the expansion sheet on the coil conductor side corresponds to the first surface of the invention and the surface of the expansion sheet on the stator core side corresponds to the second surface of the invention, the portion of the expansion sheet adjacent the first surface corresponds to the first layer portion, the portion of the expansion sheet adjacent the second surface corresponds to the second layer portion, the coil conductor-side expansion layer corresponds to the first expansion layer, the stator core-side expansion layer corresponds to the second expansion layer.

The insulating film 50 has a property of ensuring rigidity and insulation from the earth, and functions as the base material of the expansion sheet 16a. Meanwhile, both the stator core-side expansion layer 30a and the coil conductor-side expansion layer 40a expand when heated, and function as joining material that joins to both the stator core 10 and the coil conductor 18 to immobilize the coil conductor 18. When the expansion sheet 16a, in which the coil conductor-side expansion layer 40a is formed using an epoxy resin composition that expands by a higher volume increase amount than the stator core-side expansion layer 30a when heated is used, the coil conductor-side expansion layer 40a, in particular, of the expansion sheet 16a expands when heated, and spreads throughout the gap formed between the inner wall surface 14A of the slot 14 and the coil conductor 18. As a result, the stator core 10 is joined to the stator core-side expansion layer 30a, and the coil conductor 18 (or more specifically, a coating, not shown, that covers an outer peripheral surface of the coil conductor 18) is joined to the coil conductor-side expansion layer 40a, such that the coil conductor 18 is appropriately immobilized (see FIGS. 4 and 5).

Figure 6:
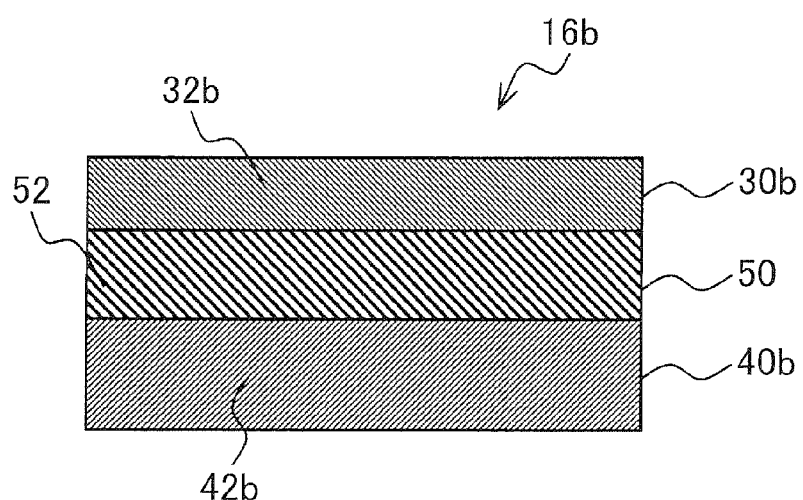
FIG. 6 is a partial sectional view of a second embodiment of an expansion sheet for a rotary electric machine of the invention.

FIG. 6 is a sectional view schematically showing a structure of an expansion sheet according to a second embodiment of the invention. As shown in FIG. 6, an expansion sheet 16b includes: a stator core-side expansion layer 30b that contains an epoxy resin composition 32b that expands when heated; a coil conductor-side expansion layer 40b that contains an epoxy resin composition 42b which expands when heated, and that is thicker than the stator core-side expansion layer 30b; and an insulating film 50 that is arranged between the stator core-side expansion layer 30b and the coil conductor-side expansion layer 40b, and contains insulating material 52. The expansion sheet 16b is arranged such that one surface of the stator core-side expansion layer 30b contacts one surface of the insulating film 50, and one surface of the coil conductor-side expansion layer 40b contacts the other surface of the insulating film 50.

In FIG. 6, when the expansion sheet 16 expands by being heated, the epoxy resin compositions 32b and 42b contained in the expansion sheet 16b may be the same or different from each other, as long as the amount of volume increase, caused by heating, of the coil conductor-side expansion layer 40b is larger than that of the stator core-side expansion layer 30b. In particular, having the epoxy resin compositions 32b and 42b be the same is advantageous in terms of procuring the material. The stator core is joined to the stator core-side expansion layer 30b, and the coil conductor is joined to the coil conductor-side expansion layer 40b, by heating the expansion sheet 16b. At this time, the amount of volume increase, caused by heating, of the coil conductor-side expansion layer 40b is larger than that of the stator core-side expansion layer 30b, so that the expanded coil conductor-side expansion layer 40b spreads throughout the gap formed on the coil conductor side, thus appropriately immobilizing the coil conductor.

Figure 7:
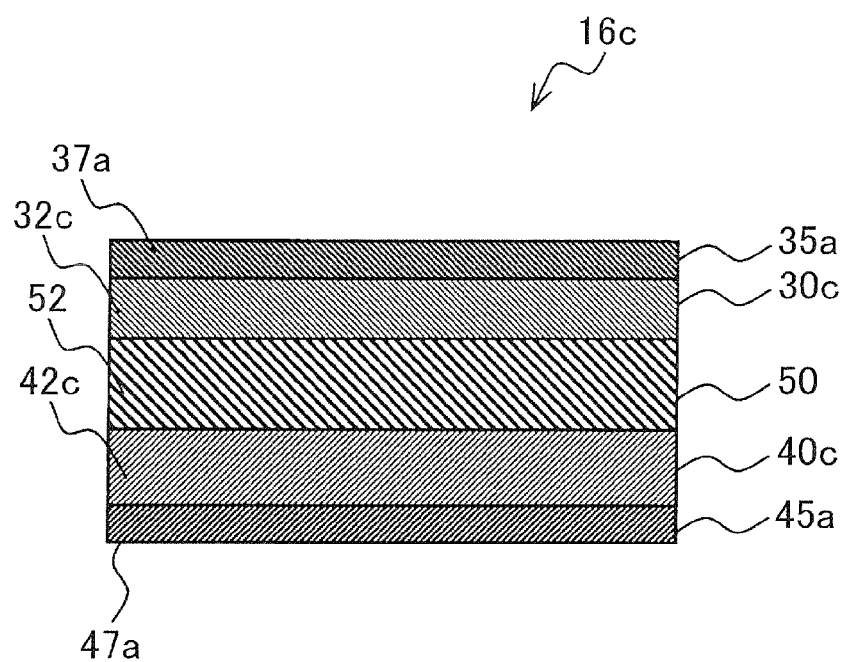
FIG. 7 is a partial sectional view of a third embodiment of an expansion sheet for a rotary electric machine of the invention.

FIG. 7 is a sectional view schematically showing the structure of an expansion sheet according to a third embodiment of the invention. As shown in FIG. 7, an expansion sheet 16c includes: a stator core-side expansion layer 30c that contains an epoxy resin composition 32c that expands when heated; a coil conductor-side expansion layer 40c that contains an epoxy resin composition 42c which expands when heated, and that expands by a higher volume increase amount than the stator core-side expansion layer 30c when heated; an insulating film 50 that is arranged between the stator core-side expansion layer 30c and the coil conductor-side expansion layer 40c, and contains insulating material 52; a stator core-side joining layer 35a that is arranged on the outer side of the stator core-side expansion layer 30c and contains joining material 37a; and a coil conductor-side joining layer 45a that is arranged on the outer side of the coil conductor-side expansion layer 40c and contains joining material 47a. The expansion sheet 16c is arranged such that one surface of the stator core-side joining layer 35a contacts one surface of the stator core-side expansion layer 30c, one surface of the insulating film 50 contacts the other surface of the stator core-side expansion layer 30c, one surface of the coil conductor-side expansion layer 40c contacts the other surface of the insulating film 50, and one surface of the coil conductor-side joining layer 45a contacts the other surface of the coil conductor-side expansion layer 40c. Note that in all embodiments described herein, the coil conductor-side joining layer corresponds to the first joining layer and the stator core-side joining layer corresponds to the second joining layer.

In FIG. 7, the epoxy resin compositions 32c and the 42c contained in the expansion sheet 16b may be the same or they may be different from each other, as long as the coil conductor-side expansion layer 40c expands by a higher volume increase amount than the stator core-side expansion layer 30c when heated. That is, combinations of the coil conductor-side expansion layer and the stator core-side expansion layer such as those illustrated in FIGS. 4 and 6 may be applied. Meanwhile, the stator core-side joining layer 35a and the coil conductor-side joining layer 45a are both made of resin material that has excellent joining performance with respect to the stator core and the coil conductor, respectively, and also has suitable flexibility so as to be able to change shape with the expansion of the corresponding resin layers. At this time, the coil conductor-side expansion layer 40c expands by a higher volume increase amount than the stator core-side expansion layer 30c when heated, so that the expanded coil conductor-side expansion layer 40c and the coil conductor-side joining layer 45a spread throughout the gap formed on the coil conductor side, thus appropriately immobilizing the coil conductor.

Figure 8:
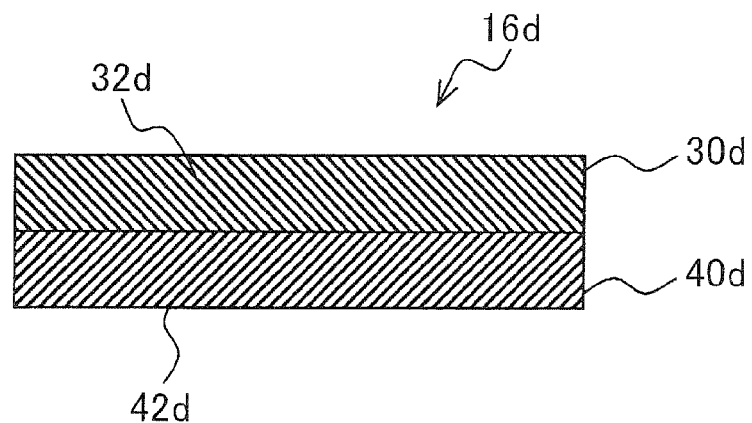
FIG. 8 is a partial sectional view of a fourth embodiment of an expansion sheet for a rotary electric machine of the invention.

FIG. 8 is a sectional view schematically showing a structure of an expansion sheet of a fourth embodiment of the invention. As shown in FIG. 8, an expansion sheet 16d includes a stator core-side expansion layer 30d that contains an epoxy resin composition 32d that expands when heated, and a coil conductor-side expansion layer 40d that contains an epoxy resin composition 42d which expands when heated, and that expands by a higher volume increase amount than the stator core-side expansion layer 30d when heated. The expansion sheet 16d is arranged such that one surface of the stator core-side expansion layer 30d contacts one surface of the coil conductor-side expansion layer 40d.

In FIG. 8, the epoxy resin compositions 32d and 42d contained in the expansion sheet 16d may be the same or they may be different from each other, as long as the coil conductor-side expansion layer 40d expands by a higher volume increase amount than the stator core-side expansion layer 30d when heated. That is, combinations of the coil conductor-side expansion layer and the stator core-side expansion layer such as those illustrated in FIGS. 4 and 6 may be applied. At this time, the coil conductor-side expansion layer 40d expands by a higher volume increase amount than the stator core-side expansion layer 30d when heated, so that the expanded coil conductor-side expansion layer 40d spreads throughout the gap formed on the coil conductor side, thus appropriately immobilizing the coil conductor. In the fourth embodiment, a member corresponding to the insulating film 50 of the expansion sheets 16a to 16c of the first to third embodiments illustrated in FIGS. 4, 6, and 7 is not provided. Therefore, the structure is preferably one in which insulating material such as an epoxy resin composition, for example, for imparting the appropriate insulation is used in at least one of the stator core-side expansion layer 30d and the coil conductor-side expansion layer 40d, and impregnated into a felt-like sheet base material.

Figure 9:
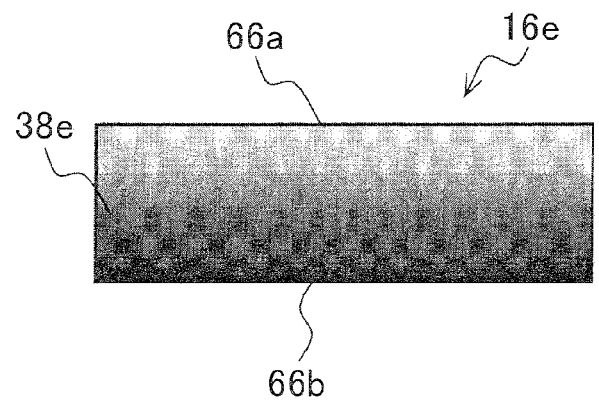
FIG. 9 is a partial sectional view of a fifth embodiment of an expansion sheet for a rotary electric machine of the invention.

FIG. 9 is a sectional view schematically showing a structure of an expansion sheet according to a fifth embodiment of the invention. As shown in FIG. 9, an expansion sheet 16e contains an epoxy resin composition 38e that expands when heated. The expansion sheet 16e is configured such that the amount of volume increase caused by heating increases gradually from a stator core-side end surface 66a toward a coil conductor-side end surface 66b. The expansion sheet may be configured such that the amount of volume increase caused by heating increases stepwise from a stator core-side end surface toward a coil conductor-side end surface.

In FIG. 9, when the expansion sheet 16e expands by being heated, the type of component contained in the epoxy resin composition 38e may be the same throughout in the thickness direction of the expansion sheet 16e, may change gradually, or may change stepwise, as long as the amount of volume increase, caused by heating, on the coil conductor-side end surface 66b side is larger than that on the stator core-side end surface 66a side. At this time, the coil conductor-side end surface 66b side expands by a higher volume increase amount than the stator core-side end surface 66a when heated, so that the expansion sheet 16e spreads throughout the gap formed on the coil conductor side, thus appropriately immobilizing the coil conductor. In the fifth embodiment, the expansion sheet 16e may contain insulating material for imparting the appropriate insulation, similar to the expansion sheet 16d of the fourth embodiment shown in FIG. 8.

Figure 10:
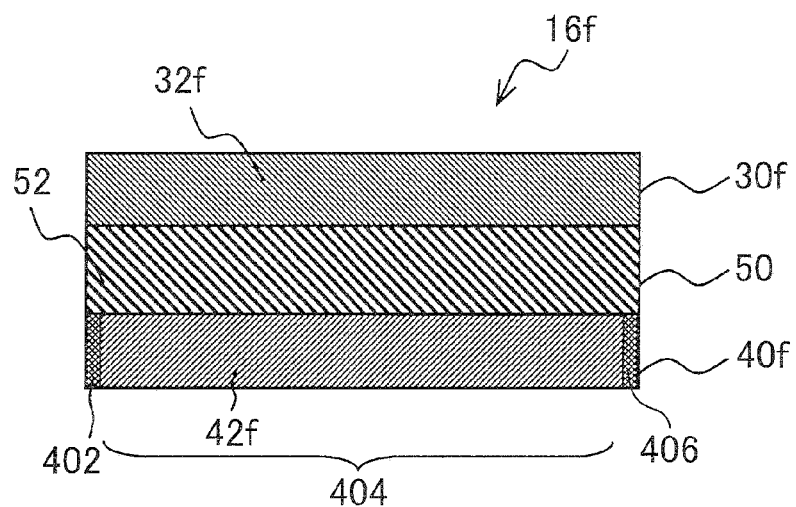
FIG. 10 is a partial sectional view of a sixth embodiment of an expansion sheet for a rotary electric machine of the invention.

FIG. 10 is a sectional view schematically showing a structure of an expansion sheet according to a sixth embodiment of the invention. As shown in FIG. 10, an expansion sheet 16f includes: a stator core-side expansion layer 30f that contains an epoxy resin composition 32f that expands when heated; a coil conductor-side expansion layer 40f that contains an epoxy resin composition 42f, and that expands by a higher volume increase amount than the stator core-side expansion layer 30f when heated; and an insulating film 50 that is arranged between the stator core-side expansion layer 30f and the coil conductor-side expansion layer 40f, and contains insulating material 52. The expansion sheet 16f is arranged such that one surface of the stator core-side expansion layer 30f contacts one surface of the insulating film 50, and one surface of the coil conductor-side expansion layer 40f contacts the other surface of the insulating film 50.

The expansion sheet 16f shown in FIG. 10 has a structure similar to those of the expansion sheets 16a and 16b of the first and second embodiments shown in FIGS. 4 and 6, except that the amount of volume increase, caused by heating, of edge portions 402 and 406 of the coil conductor-side expansion layer 40f is lower than that of a center portion 404 that is sandwiched between the edge portions 402 and 406. The edge portions 402 and 406 are provided at an outer periphery of the center portion 404. In this case, "the amount of volume increase is lower than that of the center portion" means that an epoxy resin composition that expands at a lower volume increase amount than the center portion 404 is used in the edge portions 402 and 406. As a modification of the sixth embodiment, the structure may be such that at least a portion of the insulating film 50 is exposed by not forming the coil conductor-side expansion layer 40f in locations corresponding to the edge portions 402 and 406. According to the sixth embodiment, it is possible to manufacture a rotary electric machine having the desired performance, in which excess resin is inhibited from protruding out to the coil conductor side as it expands by being heated, when the expansion sheet 16f is applied to the inner wall surface of the slot. The sixth embodiment describes a structure that reduces the amount of volume increase, caused by heating, of the edge portions 402 and 406 of the coil conductor-side expansion layer 40f that correspond to two sides of the expansion sheet 16f that are arranged along the axial direction of the rotary electric machine when the expansion sheet 16f is applied to the inner wall surface of the slot. Alternatively, however, the structure may be one that reduces the amount of volume increase, caused by heating, of edge portions of the coil conductor-side expansion layer 40f that correspond to two sides of the expansion sheet 16f that are arranged at both axial end surfaces (see FIG. 1) of the stator core, or one that reduces the volume increase amount for both the edge portions 402 and 406 of the coil conductor-side expansion layer 40f that correspond to two sides of the expansion sheet 16f that are arranged along the axial direction of the rotary electric machine when the expansion sheet 16f is applied to the inner wall surface of the slot, and the edge portions of the coil conductor-side expansion layer 40f that correspond to two sides of the expansion sheet 16f that are arranged at both axial end surfaces (see FIG. 1) of the stator core.

Figure 11:
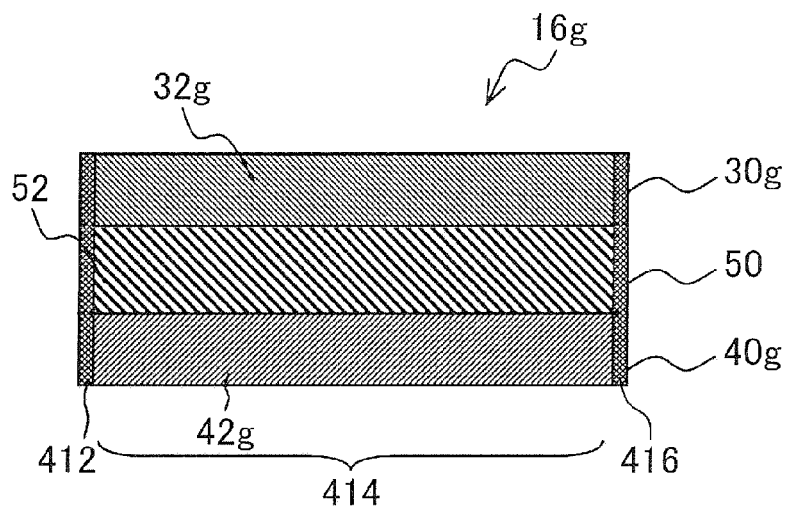
FIG. 11 is a partial sectional view of a seventh embodiment of an expansion sheet for a rotary electric machine of the invention.

FIG. 11 is a sectional view schematically showing a structure of an expansion sheet according to a seventh embodiment of the invention. As shown in FIG. 11, an expansion sheet 16g includes: a stator core-side expansion layer 30g that contains an epoxy resin composition 32g that expands when heated; a coil conductor-side expansion layer 40g that contains an epoxy resin composition 42g, and that expands by a higher volume increase amount than the stator core-side expansion layer 30g when heated; and an insulating film 50 that is arranged between the stator core-side expansion layer 30g and the coil conductor-side expansion layer 40g, and contains insulating material 52. The expansion sheet 16g is arranged such that one surface of the stator core-side expansion layer 30g contacts one surface of the insulating film 50, and one surface of the coil conductor-side expansion layer 40g contacts the other surface of the insulating film 50.

In FIG. 11, the expansion sheet 16g has a structure similar to those of the expansion sheets 16a and 16b of the first and second embodiments shown in FIGS. 4 and 6, except that the amount of volume increase, caused by heating, of the stator core-side expansion layer 30g and the coil conductor-side expansion layer 40g is lower than that of a center portion 414 due to the fact that edge portions 412 and 416 of the expansion sheet 16g are cut by heat treatment such as laser cutting or the like, for example. According to the seventh embodiment, it is possible to manufacture a rotary electric machine having the desired performance, in which excess resin is inhibited from protruding out to the coil conductor side as it expands by being heated, when the expansion sheet 16g is applied to the inner wall surface of the slot.

As a modification of the seventh embodiment, heat treatment such as laser cutting may be performed on edge portions corresponding to two sides of the expansion sheet 16g that are arranged at both axial end surfaces of the stator core, or heat treatment such as laser cutting may be performed on both the edge portions 412 and 416 of the expansion sheet 16g, and the edge portions corresponding to the two sides of the expansion sheet 16g that are arranged at both axial end surfaces of the stator core. Also, a volume increase amount reduction process illustrated in FIG. 10 may be performed on one or some of the edge portions that include the four sides of the expansion sheet 16, and heat treatment such as laser cutting may be performed on the remaining edge portion(s).

Next, the compositions of the expansion sheet 16a to 16g described above will be described in detail.

The epoxy resin compositions 32a, 32b, 32c, 32d, 32f, 32g, 38e, 42a, 42b, 42c, 42d, 42f, and 42g of the first to seventh embodiments typically contain an epoxy resin and an expansion filler having a thermal expansion property. The expansion filler thermally expands and the stator core side of the expansion sheet increases in volume, which makes it possible to adhere the coil conductor to the inner wall surface of the slot without any gaps. The thermal expansion property in the invention refers to the property of expanding beyond the thermal expansion normally displayed by an ordinary substance. Some examples of material having such a thermal expansion property are given below.

The expansion filler of the first to seventh embodiments can be classified into two types, i.e., an inorganic or organic chemical expansion agent, and a microcapsule physical expansion agent. The inorganic or organic chemical expansion agent expands through gasification by thermal decomposition. Also, there are various types of these two types of expansion agents, and they are manufactured by a variety of methods. For example, taking into account the effect on the hardenability (i.e., curability) and physical property of resin, and the uniformity of expansion and the like, a thermally expandable microcapsule, which is one of microcapsule physical expansion agents, is preferable because it has few trade-offs. Also, a thermally expandable microcapsule that is one of microcapsule physical expansion agents is a microcapsule in which a low-boiling point substance in liquid form is encapsulated by a polymer shell made of a thermoplastic polymer. This thermally expandable microcapsule gasifies near the softening temperature of the polymer shell, or at a temperature equal to or higher than that temperature, and in doing so, thermally expands.

For the expansion filler of the first to seventh embodiments, a thermally expandable microcapsule in which liquid carbon dioxide gas is sealed inside a polymer shell made of a thermoplastic polymer, for example, is used. When the volume expansion becomes equal to or greater than five times this thermally expandable microcapsule, the relative permittivity becomes equal to or less than 1.4, so that reduction of permittivity of the expansion sheet is promoted, and the gap between the inner wall surface of the slot and the coil conductor is reduced by the volume expansion of the expansion sheet.

Some examples of an epoxy resin that may be applied to the stator core-side expansion layers 30a to 30d, 30f, and 30g of the first to fourth, sixth, and seventh embodiments are, for example, bisphenol A type epoxy resin, bisphenol F type epoxy resin, biphenyl type epoxy resin, and novolac-type epoxy resin, but the epoxy resin is not limited to these. One or a plurality of types of epoxy resins may be used together with a curing agent or a hardening accelerator as necessary, and applied.

As an epoxy resin applied to the coil conductor-side expansion layers 40a to 40d, 40f, and 40g of the first to fourth, sixth, and seventh embodiments, an epoxy resin similar to that which is applied to the stator core-side expansion layers 30a to 30d, 30f, and 30g may be applied.

The type of epoxy resin that is applied to the stator core-side expansion layer and the coil conductor-side expansion layer at this time may be the same or different from each other.

The epoxy resin applied to the expansion sheet 16e of the fifth embodiment may be manufactured by applying the plurality of epoxy resins applied to the stator core-side expansion layers 30a to 30d, 30f, and 30g, and the coil conductor-side expansion layers 40a to 40d, 40f, and 40g, in an appropriate combination, and/or making the amount of the expansion filler different in a gradual manner.

In the stator core-side expansion layers 30a to 30d, 30f, and 30g in the first to fourth, sixth, and seventh embodiments, at least 1 but less than 3 parts by mass of the expansion filler is mixed with 100 parts by mass of the applied epoxy resin. If the amount of expansion filler is equal to or greater than 3 parts by mass, it may become extraneous material. If the amount of expansion filler is less than 1 part by mass, the effect of filling the gap between the stator core and the expansion sheet may not be sufficiently exhibited.

In the coil conductor-side expansion layers 40a to 40d, 40f, and 40g of the first to fourth, sixth, and seventh embodiments, at least 3 but no more than 7 parts by mass of the expansion filler is mixed with 100 parts by mass of the applied epoxy resin. If the amount of expansion filler is greater than 7 parts by mass, it may become extraneous material. If the amount of expansion filler is less than 3 part by mass, the effect of filling the gap between the coil conductor and the expansion sheet may not be sufficiently exhibited.

The thickness of the expansion sheets 16a to 16g of the first to seventh embodiments is equal to or less than 350 µm, and preferably between 300 µm and 340 µm, inclusive. If the thickness of the expansion sheets 16a to 16g exceeds 350 µm, the space factor of the coil conductor inside the slot will not improve. On the other hand, if the thickness of the expansion sheets 16a to 16g is less than 300 µm, the gap may not be filled and sufficient adhesive force may not be generated.

The thickness of the stator core-side expansion layers 30a, 30b, 30f, and 30g of the first, second, sixth, and seventh embodiments is equal to or less than 125 µm, and preferably between 100 µm and 120 µm, inclusive. If the thickness of the stator core-side expansion layers 30a, 30b, 30f, and 30g exceeds 125 µm, the space factor of the coil conductor in the slot will not improve. On the other hand, if the thickness of the stator core-side expansion layers 30a, 30b, 30f, and 30g is less than 100 µm, the gap may not be filled and sufficient adhesive force may not be generated.

The sum of the thickness of the stator core-side expansion layer 30c and that of the stator core-side joining layer 35a in the third embodiment is equal to or less than 125 µm, and preferably between 100 µm and 120 µm, inclusive. If the sum of the thickness of the stator core-side expansion layer 30c and that of the stator core-side joining layer 35a exceeds 125 µm, the space factor of the coil conductor in the slot will not improve. On the other hand, if the sum of the thickness of the stator core-side expansion layer 30c and that of the stator core-side joining layer 35a is less than 100 µm, the gap may not be filled and sufficient adhesive force may not be generated.

The thickness of the stator core-side expansion layer 30d in the fourth embodiment is equal to or less than 175 µm, and preferably between 150 µm and 170 µm, inclusive. If the thickness of the stator core-side expansion layer 30d exceeds 175 µm, the space factor of the coil conductor in the slot will not improve. On the other hand, if the thickness of the stator core-side expansion layer 30d is less than 150 µm, the gap may not be filled and sufficient adhesive force may not be generated.

The thickness of the coil conductor-side expansion layers 40a, 40b, 40f, and 40g in the first, second, sixth, and seventh embodiments is equal to or less than 125 µm, and preferably between 100 µm and 120 µm, inclusive. If the thickness of the coil conductor-side expansion layers 40a, 40b, 40f, and 40g exceeds 125 µm, the space factor of the coil conductor in the slot will not improve. On the other hand, if the thickness of the coil conductor-side expansion layers 40a, 40b, 40f, and 40g is less than 100 µm, the gap may not be filled and sufficient adhesive force may not be generated.

The sum of the thickness of the coil conductor-side expansion layer 40c and that of the coil conductor-side joining layer 45a in the third embodiment is equal to or less than 125 µm, and preferably between 100 µm and 120 µm, inclusive. If the sum of the thickness of the coil conductor-side expansion layer 40c and the coil conductor-side joining layer 45a exceeds 125 µm, the space factor of the coil conductor in the slot will not improve. On the other hand, if the sum of the thickness of the coil conductor-side expansion layer 40c and the coil conductor-side joining layer 45a is less than 100 µm, the gap may not be filled and sufficient adhesive force may not be generated.

The thickness of the coil conductor-side expansion layer 40d in the fourth embodiment is equal to or less than 175 µm, and preferably between 150 µm and 170 µm, inclusive. If the thickness of the coil conductor-side expansion layer 40d exceeds 175 µm, the space factor of the coil conductor in the slot will not improve. On the other hand, if the thickness of the coil conductor-side expansion layer 40d is less than 150 µm, the gap may not be filled and sufficient adhesive force may not be generated.

For the insulating material 52 that forms the insulating film 50 of the first to third, sixth, and seventh embodiments, a polyethylene naphthalate film, a polyimide film, or a polyetherimide film or the like may be used, for example. The thickness of the insulating film 50 of the first to third, sixth, and seventh embodiments is equal to or less than 100 µm, and preferably between 50 µm and 100 µm, inclusive. If the thickness of the insulating film 50 exceeds 100 µm, the resin thickness of the expansion layer may end up decreasing. On the other hand, if the thickness of the insulating film 50 is less than 50 µm, the electrical insulation may be unsatisfactory.

In the expansion sheets 16a, 16f, and 16g of the first, sixth, and seventh embodiments, the amounts of volume increase, caused by heating, of the stator core-side expansion layers 30a, 30f, and 30g are preferably between 0 µm and 100 µm, inclusive. If the amounts of volume increase, caused by heating, of the stator core-side expansion layers 30a, 30f, and 30g exceed 100 µm, they may become extraneous material. On the other hand, the amounts of volume increase, caused by heating, of the coil conductor-side expansion layers 40a, 40f, and 40g are higher than the amounts of volume increase, caused by heating, of the corresponding stator core-side expansion layers 30a, 30f, and 30g, respectively, and preferably equal to or greater than 590 µm. If the amounts of volume increase, caused by heating, of the coil conductor-side expansion layers 40a, 40f, and 40g are less than 590 µm, the gap may not be filled and sufficient adhesive force may not be generated. However, this does not apply to the edge portions 402, 406, 412, and 416, as described above.

In the expansion sheet 16b of the second embodiment, the amount of volume increase, caused by heating, of the stator core-side expansion layer 30b is preferably between 0 µm and 100 µm, inclusive. If the amount of volume increase, caused by heating, of the stator core-side expansion layer 30b exceeds 100 µm, it may become extraneous material. On the other hand, the amount of volume increase, caused by heating, of the coil conductor-side expansion layer 40b is higher than the amount of volume increase, caused by heating, of the stator core-side expansion layer 30b, and preferably equal to or greater than 590 µm. If the amount of volume increase, caused by heating, of the coil conductor-side expansion layer 40b is less than 590 µm, the gap may not be filled and sufficient adhesive force may not be generated.

In the expansion sheet 16c of the third embodiment, the amount of volume increase, caused by heating, of the stator core-side expansion layer 30c is preferably between 0 µm and 100 µm, inclusive. If the amount of volume increase, caused by heating, of the stator core-side expansion layer 30c exceeds 100 µm, it may become extraneous material. On the other hand, the amount of volume increase, caused by heating, of the coil conductor-side expansion layer 40c is higher than the amount of volume increase, caused by heating, of the stator core-side expansion layer 30c, and preferably equal to or greater than 590 µm. If the amount of volume increase, caused by heating, of the coil conductor-side expansion layer 40c is less than 590 µm, the gap may not be filled and sufficient adhesive force may not be generated.

In the expansion sheet 16d of the fourth embodiment, the amount of volume increase, caused by heating, of the stator core-side expansion layer 30d is preferably between 0 µm and 100 µm, inclusive. If the amount of volume increase, caused by heating, of the stator core-side expansion layer 30d exceeds 100 µm, it may become extraneous material. On the other hand, the amount of volume increase, caused by heating, of the coil conductor-side expansion layer 40d is higher than the amount of volume increase, caused by heating, of the stator core-side expansion layer 30d, and preferably equal to or greater than 590 µm. If the amount of volume increase, caused by heating, of the coil conductor-side expansion layer 40d is less than 590 µm, the gap may not be filled and sufficient adhesive force may not be generated.

In the expansion sheet 16e of the fifth embodiment, the amount of volume increase, caused by heating, of the coil conductor-side end surface 66b side is adjusted to gradually become higher than the amount of volume increase, caused by heating, of the stator core-side end surface 66a side. At this time, the expansion sheet 16e is manufactured such that the amount of volume increase, caused by heating, of the stator core-side end surface 66a side corresponds to a range of one of the amounts of volume increase, caused by heating, of the stator core-side expansion layers 30a, 30b, 30c, 30d, 30f, and 30g, and the amount of volume increase, caused by heating, of the coil conductor-side end surface 66b side corresponds to a range of one of the coil conductor-side expansion layers 40a, 40b, 40c, 40d, 40f, and 40g.

For the manufacturing method of the expansion sheets 16a to 16g, in the case of the expansion sheet 16a shown in FIG. 4, for example, the stator core-side expansion layer 30a, the insulating film 50, and the coil conductor-side expansion layer 40a may each be manufactured separately, and then be adhered or joined together with a suitable adhesive or the like. Also, as another embodiment, the expansion sheet 16a may be formed by applying or impregnating the epoxy resin composition 32a that contains epoxy resin and expansion filler to or into one surface of the insulating film 50, and applying or impregnating the epoxy resin composition 42a that contains epoxy resin and expansion filler to or into the other surface of the insulating film 50, and then drying them as necessary. However, the manufacturing method of the expansion sheets 16a to 16g is not limited to these.

Figure 12:
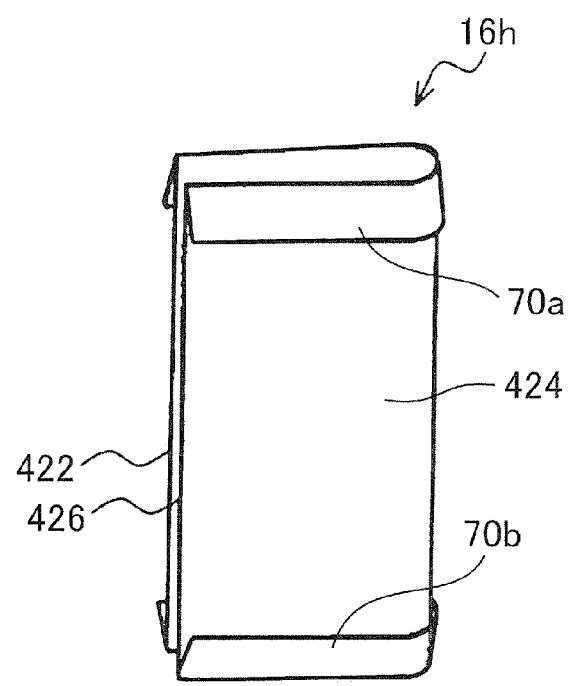
FIG. 12 is a diagram of another example of a mode for attaching an expansion sheet for a rotary electric machine of the invention to the slot.

In the embodiments described above, the expansion sheets 16a to 16g that have what is called a cuff-less shape that enables them to be inserted into the slot with the shape matched with that of the inner wall surface of the slot by bending as necessary are described. However, an expansion sheet 16h provided with cuff portions 70a and 70b like those illustrated in FIG. 12, that facilitate fixing the stator core into the slot may also be applied. In FIG. 12, as the expansion sheet 16h, an expansion sheet having a structure similar to that of the expansion sheets 16a to 16g described above, except for the cuff portions 70a and 70b, may be applied. Also, with regard to the cuff portions 70a and 70b, expansion performance is not necessary, so that the expansion ratio reduction process illustrated in FIG. 10 or an expansion reduction process with heat treatment, for example, may be performed. The edge portions 422 and 426 and the center portion 424 shown in FIG. 12 correspond to the edge portions 402 and 406 and the center portion 404 shown in FIG. 10, and the edge portions 412 and 416 and the center portion 414 shown in FIG. 11, respectively.

(Stator for a Rotary Electric Machine)

Figure 5:
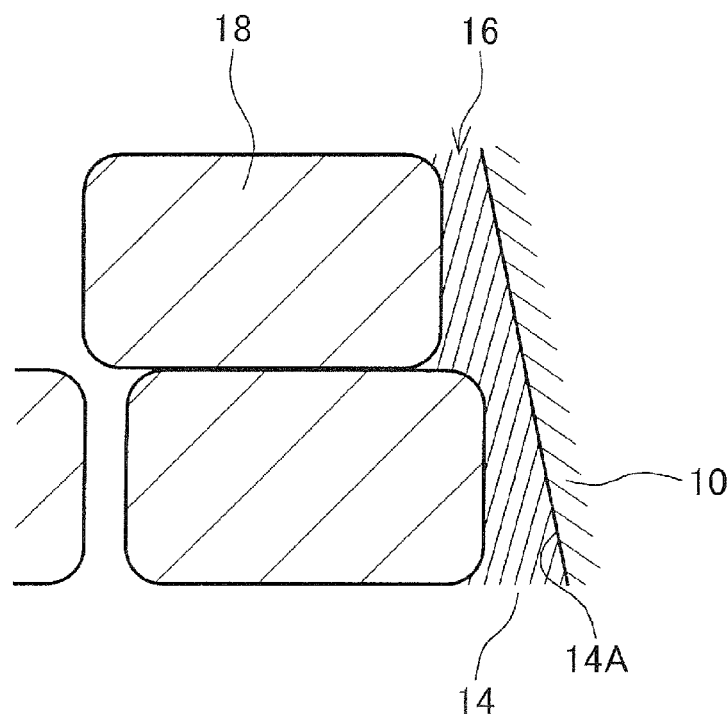
FIG. 5 is a partial expanded view for illustrating a case in which an expansion sheet for a rotary electric machine of the invention is applied to the gap shown in FIG. 3.

An embodiment of a stator for a rotary electric machine according to the invention includes: a stator core 10 provided with the slots 14; the coil conductor 18 housed inside the slots 14; and the expansion sheet 16 arranged between the stator core 10 and the coil conductor 18, as shown in FIGS. 2B and 5. The expansion sheet 16 is one of the expansion sheets 16a to 16h described above, and appropriately fixes the coil conductor 18 to the stator core 10.

With the stator 20 of this embodiment having the structure described above, the gap between the coil conductor housed in the slot and the slot inner wall surface is eliminated or reduced, thus improving the fixedness of the coil conductor inside the slot, as compared with the case where an insulating sheet or an expansion sheet not having the structure described above is applied.

(Manufacturing Method of the Stator for a Rotary Electric Machine)

Figure 13:
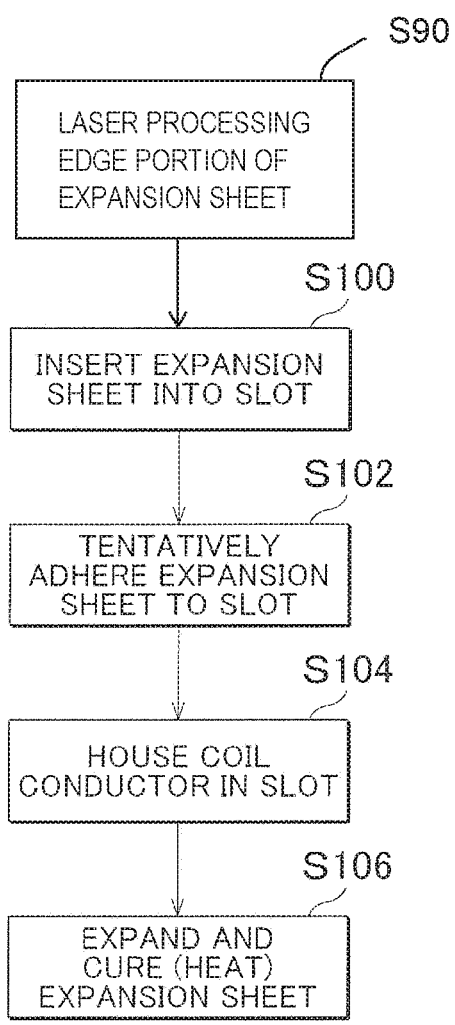
FIG. 13 is a flowchart for illustrating an embodiment of a manufacturing method of a stator for a rotary electric machine of the invention.
Figure 14:
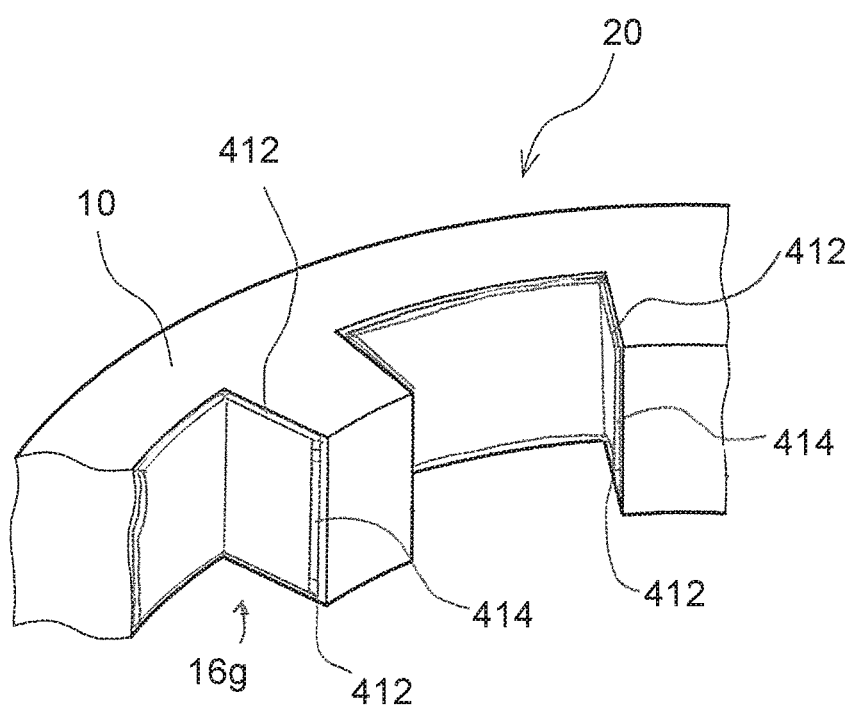
FIG. 14 is a partial perspective view of an example of a stator core of a rotary electric machine, in which an expansion sheet is inserted into the slot.

An embodiment of a manufacturing method of the motor stator according to the invention will hereinafter be described with reference to FIGS. 2B and 13.

First, a laser processing is performed on an edge portion of an expansion sheet 16 that is one of the expansion sheets 16a to 16h described above (S90). The laser processing limits an expansion of the edge portion of the expansion sheet Next the expansion 16 is inserted into the slot 14 (S100). The expansion sheet 16 may be bent into the slot shape in advance such that the stator, core-side surface of the expansion sheet 16 contacts the inner wall surface of the slot 14 at this time.

Next, the stator core-side surface of the expansion sheet 16 that is inserted into the slot 14 is tentatively adhered to the inner wall surface of the slot 14 (S102). The method for this tentative adhering is not particularly limited. For example, the expansion sheet may be tentatively adhered to the stator core by softening the expansion sheet by applying heat of a temperature (such as 90° C. or lower) that will not expand the expansion layer and will not generate adhesive force.

Next, the coil conductor 18 is housed in the slot 14 (S104). The method for housing the coil conductor 18 may be any known method for forming what is called a concentrated winding. Also, when flat wire is applied, for example, the winding may be edgewise winding or flatwise winding.

Next, the expansion sheet 16 is expanded and cured (S 106). Because the expansion sheet 16 is tentatively adhered to the inner wall surface of the slot 14, the distance between the inner wall surface of the slot 14 and the stator core 10 side surface of the expansion sheet 16 is narrow. Therefore, the stator core 10 side surface of the expansion sheet 16 can easily be adhered to the inner wall surface of the slot 14 by heating the expansion sheet 16. On the other hand, the distance between the outer peripheral surface of the coil conductor 18 and the coil conductor 18 side surface of the expansion sheet 16 is greater than the distance between the inner wall surface of the slot 14 and the stator core 10 side surface of the expansion sheet 16. Therefore, the gap between the inner wall surface of the slot 14 and the coil conductor 18 is eliminated or reduced, thus improving the fixedness of the coil conductor 18 within the slot 14, by applying the expansion sheet 16a to 16h in which the coil conductor 18 side has a higher expansion ratio than the stator core 10 side as described above. In the embodiment of the invention, the suitable temperature for expanding and curing the expansion sheet 16 differs depending on the composition and the like of the applied epoxy resin composition. For example, the temperature may be approximately 150° C. to 220° C. If the temperature for expanding and curing the expansion sheet is less than 150° C., sufficient curing characteristics may not be obtained.

As long as the application of the invention is related to the manufacturing of a rotary electric machine in which a coil conductor is housed in a slot formed in a core, the invention is effective not only for the application with a stator core, but for various other applications as well, such as a rotor core, for example.

The coil conductor side may also have a sheet center portion, and a coil conductor-side expansion layer that is formed by a sheet edge portion that is provided on an outside of the sheet center portion and expands by a lower volume increase amount than the sheet center portion.

The coil conductor side may also have a sheet center portion that expands by a higher volume increase amount than the core side, and a coil conductor-side layer that is formed by a sheet edge portion that is provided on an outside of the sheet center portion and does not have the thermal expansion property.

What is claimed is:

1. An expansion sheet for a rotary electric machine, the rotary electric machine having a core and a plurality of coil conductors, the plurality of coil conductors are housed in a slot formed in the core, the expansion sheet comprising:
   a first layer portion having a first surface positioned on a side of the expansion sheet on which the plurality of coil conductors are located, the first layer portion extends across at least two coil conductors of the plurality of coil conductors, the first layer portion includes a first epoxy resin composition that expands when heated; and
   a second layer portion having a second surface positioned on a side of the expansion sheet on which the core is located, the second layer portion includes a second epoxy resin composition that expands when heated;
   wherein the first layer portion has a first expansion ratio higher than a second expansion ratio of the second layer portion such that an amount of volume increase, caused by expansion of the first epoxy resin composition when heated, of the first layer portion is higher than an amount of volume increase, caused by expansion of the second epoxy resin composition when heated, of the second layer portion.

2. The expansion sheet according to claim 1, wherein the first surface contacts at least two coil conductors of the plurality of coil conductors.

3. The expansion sheet according to claim 1, wherein the first layer portion includes a first expansion layer having a sheet center portion and a sheet edge portion that is provided at an outer periphery of the sheet center portion, and an amount of volume increase, caused by expansion used by expansion of the first epoxy resin composition when heated, of the sheet edge portion is lower than an amount of volume increase, caused by expansion used by expansion of the first epoxy resin composition when heated, of the sheet center portion.

4. The expansion sheet according to claim 3, wherein the sheet edge portion includes two side portions that correspond to two sides of the expansion sheet that are arranged along an axial direction of the rotary electric machine when the expansion sheet is inserted in the slot.

5. The expansion sheet according to claim 3, wherein the sheet edge portion includes two side portions that correspond to two sides of the expansion sheet that are arranged at both axial end surfaces of the core when the expansion sheet is inserted in the slot.

6. The expansion sheet according to claim 1, wherein:
the first layer portion includes a first layer having a sheet center portion and a sheet edge portion that is provided at an outer periphery of the sheet center portion;
an amount of volume increase, caused by expansion used by expansion of the first epoxy resin composition when heated, of the sheet center portion is higher than an amount of volume increase, caused by expansion the second epoxy resin composition when heated, of the second layer portion.

7. The expansion sheet according to claim 6, wherein the sheet edge portion includes two side portions that correspond to two sides of the expansion sheet that are arranged along an axial direction of the rotary electric machine when the expansion sheet is inserted in the slot.

8. The expansion sheet according to claim 6, wherein the sheet edge portion includes two side portions that correspond to two sides of the expansion sheet that are arranged at both axial end surfaces of the core when the expansion sheet is inserted in the slot.

9. The expansion sheet according to claim 1, wherein the first layer portion includes a first expansion layer that is closer to the first surface than the second surface, and the second layer portion includes a second expansion layer that is closer to the second surface than the first surface.

10. The expansion sheet according to claim 9, further comprising
an insulating layer that is arranged between the second expansion layer and the first expansion layer of the expansion sheet, and the insulating layer contains an insulating material.

11. The expansion sheet according to claim 9, wherein the first expansion layer is thicker than the second expansion layer.

12. The expansion sheet according to claim 9, wherein at least one of the second expansion layer and the first expansion layer includes a felt-like sheet base material that is impregnated with insulating resin material.

13. The expansion sheet according to claim 1, wherein the second layer portion includes a second joining layer adjacent to the second surface, and the first layer portion includes a first joining layer adjacent the first surface.

14. The expansion sheet according to claim 1, wherein the expansion sheet is configured such that an amount of volume increase caused by, expansion of the first epoxy resin composition and the second epoxy resin composition when heated, increases gradually in a direction from the second surface toward the first surface.

15. The expansion sheet according to claim 1, wherein the expansion sheet is configured such that an amount of volume increase caused by, expansion of the first epoxy resin composition and the second epoxy resin composition when heated, increases stepwise in a direction from the second surface toward the first surface.

16. The expansion sheet according to claim 1, wherein the first epoxy resin composition contains first epoxy resin and first expansion filler, and the second epoxy resin composition contains a second epoxy resin and a second expansion filler.

17. A stator for a rotary electric machine, comprising:
a stator core in which a slot is formed;
a plurality of coil conductors that are housed in the slot; and
an expansion sheet that fixes the plurality of coil conductors to the stator core, the expansion sheet including a first layer portion and a second layer portion, the first layer portion having a first surface positioned on a side of the expansion sheet facing the plurality of coil conductors, the first layer portion extends across at least two coil conductors of the plurality of coil conductors, the first layer portion includes a first epoxy resin composition that expands when heated, and the second layer portion having a second surface positioned on a side of the expansion sheet facing the stator core, the second layer portion includes a second epoxy resin composition that expands when heated;
wherein the first layer portion has a first expansion ratio higher than a second expansion ratio of the second layer portion such that an amount of volume increase, caused by expansion of the first epoxy resin composition when heated, of the first layer portion is higher than an amount of volume increase, caused by expansion of the second epoxy resin composition when heated, of the second layer portion.

18. A manufacturing method of a stator for a rotary electric machine, the stator having a stator core and a plurality of coil conductors housed in a slot formed in the stator core comprising:
providing an expansion sheet including a first layer portion and a second layer portion, the first layer portion having a first surface, the first layer portion includes a first epoxy resin composition that expands when heated, and the second layer portion having a second surface, the second layer portion includes a second epoxy resin composition that expands when heated, the first layer portion has a first expansion ratio higher than a second expansion ratio of the second layer portion such that an amount of volume increase, caused by expansion of the first epoxy resin composition when heated, of the first layer portion is higher than an amount of volume increase, caused by expansion of the second epoxy resin composition when heated, of the second layer portion;

inserting the expansion sheet into the slot in the stator core with the second surface facing the stator core;

adhering, to an inner wall surface of the slot, the second surface of the expansion sheet that has been inserted into the slot;

housing the plurality of coil conductors in the slot; and adhering an outer peripheral surface of at least two of the plurality of coil conductors to the first surface of the expansion sheet, and adhering the inner wall surface of the slot to the second surface of the expansion sheet, by expanding and curing the expansion sheet by heating the expansion sheet.

19. A manufacturing method of a stator for a rotary electric machine, the stator having a stator core, a plurality of coil conductors, and a slot formed in the stator core comprising:

providing an expansion sheet including a first layer portion and a second layer portion, the first layer portion having a first surface, the first layer portion includes a first epoxy resin composition that expands when heated, and the second layer portion having a second surface, the second layer portion includes a second epoxy resin composition that expands when heated, the first layer portion has a first expansion ratio higher than a second expansion ratio of the second layer portion such that an amount of volume increase, caused by expansion of the first epoxy resin composition when heated, of the first layer portion is higher than an amount of volume increase, caused by expansion of the second epoxy resin composition when heated, of the second layer portion;

limiting expansion of an edge portion of the expansion sheet by laser processing the edge portion of the expansion sheet, and then inserting the expansion sheet into the slot of the stator core with the second surface facing the stator core;

adhering, to an inner wall surface of the slot, the second surface of the expansion sheet that has been inserted into the slot;

housing the plurality of coil conductors in the slot; and adhering an outer peripheral surface of at least two of the plurality of coil conductors to the first surface of the expansion sheet, and adhering the inner wall surface of the slot to the second surface of the expansion sheet, by expanding and curing the expansion sheet by heating the expansion sheet.

* * * * *